No. 823,227.
PATENTED JUNE 12, 1906.
A. B. ROACH & A. J. HODGE.
CHEESE CUTTER.
APPLICATION FILED MAR. 8, 1905.
2 SHEETS—SHEET 1.
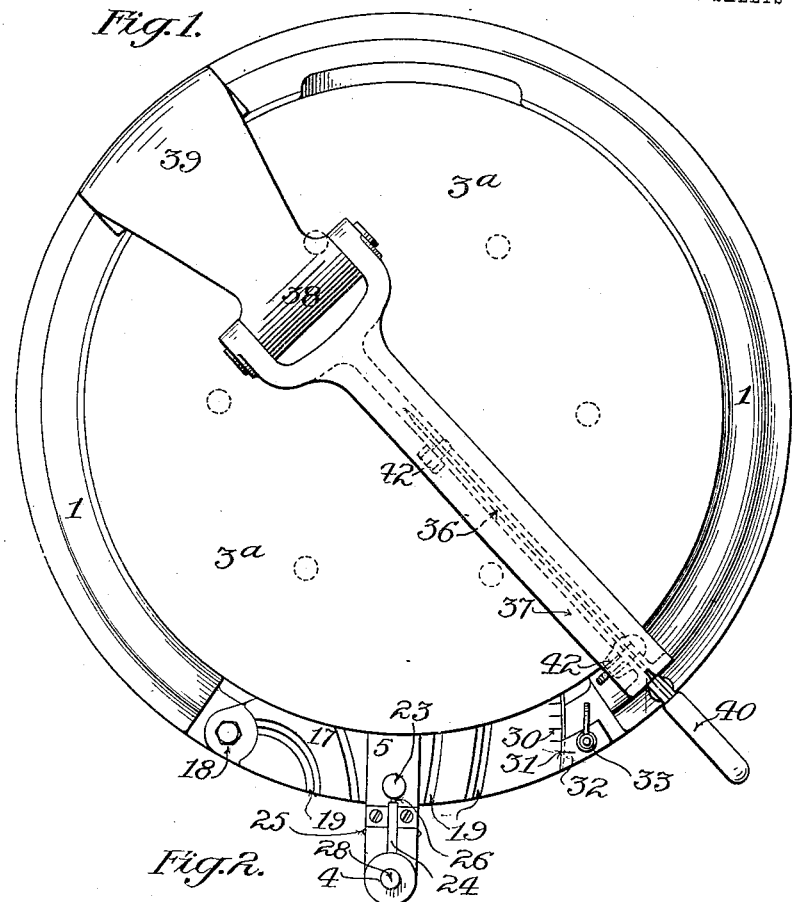
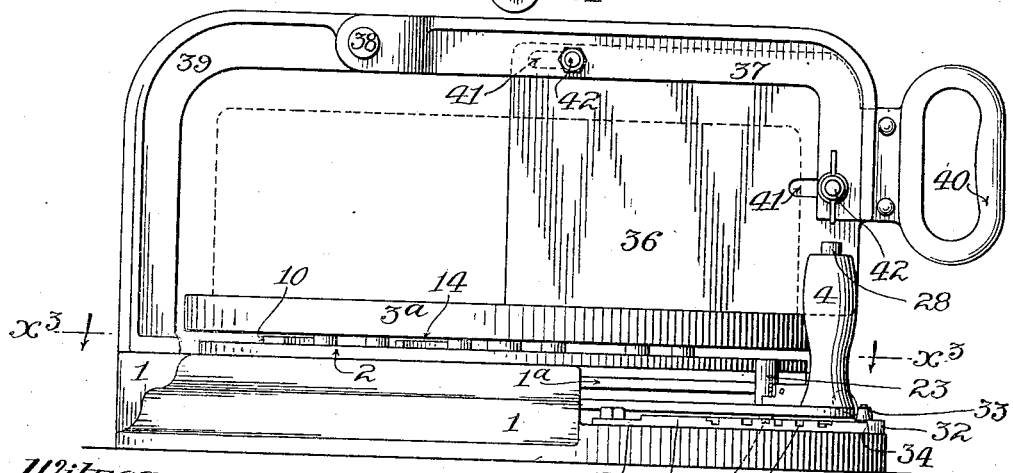
Witnesses:-
Frank L. Graham
Frederick F. Ryon
Inventors,
Arland B. Roach.
Arthur J. Hodge.
by Townsend Bros.
Attys

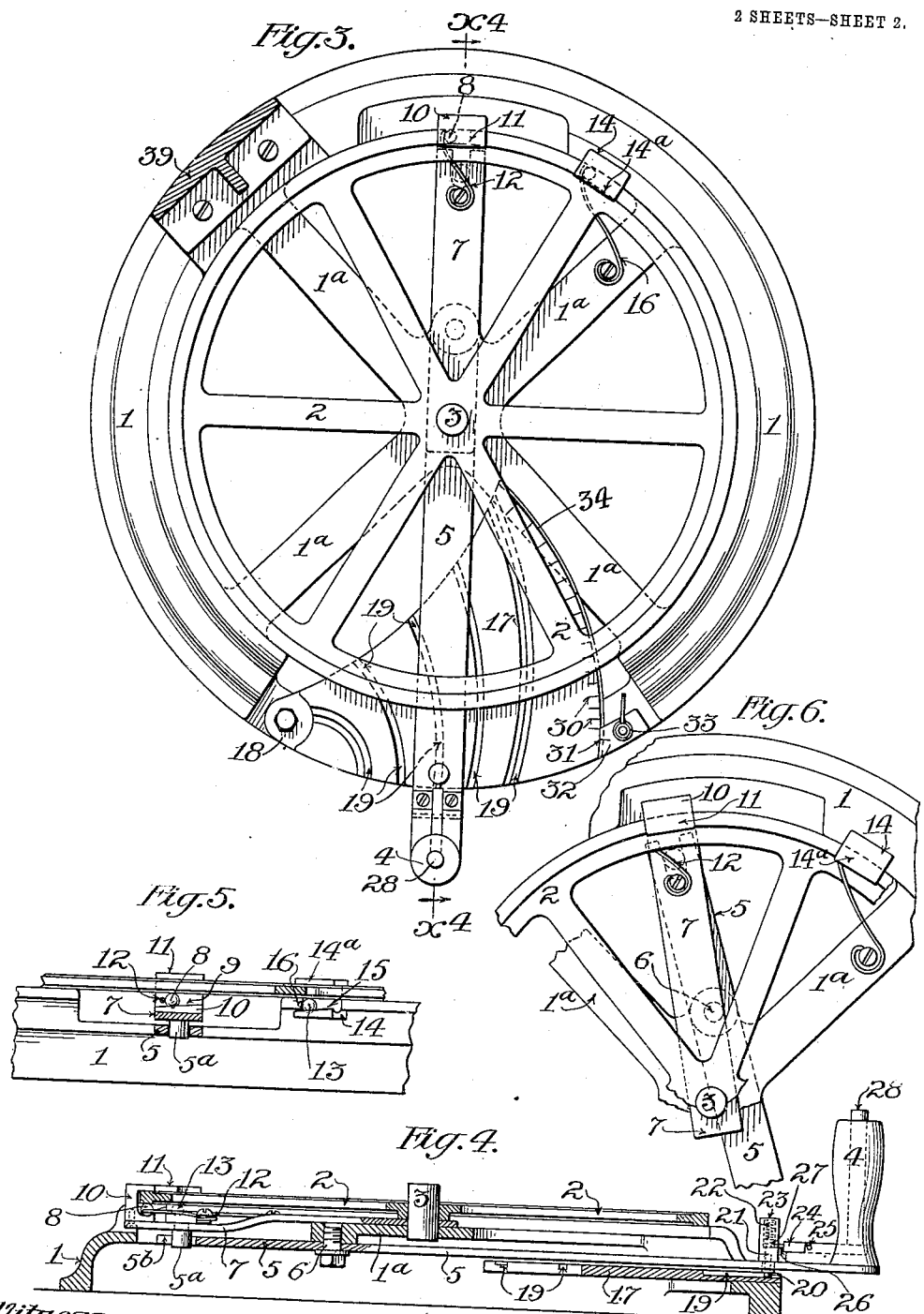

UNITED STATES PATENT OFFICE.

ARLAND B. ROACH, OF LOS ANGELES, AND ARTHUR J. HODGE, OF PASADENA, CALIFORNIA, ASSIGNORS, BY DIRECT AND MESNE ASSIGNMENTS, TO CHARLES E. DOFFLEMYER AND DAVID F. McKINNEY, OF LOS ANGELES, CALIFORNIA.

CHEESE-CUTTER.

No. 823,227.     Specification of Letters Patent.     Patented June 12, 1906.

Application filed March 8, 1905. Serial No. 249,049.

*To all whom it may concern:*

Be it known that we, ARLAND B. ROACH, a citizen of the United States, residing at Los Angeles, and ARTHUR J. HODGE, a citizen of the United States, residing at Pasadena, in the county of Los Angeles, State of California, have invented a new and useful Improvement in Cheese-Cutters, of which the following is a specification.

The main object of the present invention is to provide a cheese-cutter compact in structure and simple and efficient in operation.

Another object of the invention is to provide a device of this character with improved means for adjustment according to the weight of the cheese to be cut.

Another object of the invention is to provide a cheese-cutter wherein gearing or tooth wheels are dispensed with and the cost and liability to breakage of the device are thereby reduced to a minimum.

A further object of the invention is to provide a cheese-cutter wherein the projection of the operating and controlling parts beyond the ordinary base or frame of the cutter will be reduced to a minimum, thereby reducing the liability to breakage in shipment, &c., and making the device more convenient in operation.

The accompanying drawings illustrate the invention.

Figure 1 is a plan. Fig. 2 is a side elevation. Fig. 3 is a horizontal section on the lien $x^3 \, x^3$, Fig. 2. Fig. 4 is a vertical section on the line $x^4 \, x^4$, Fig. 3. Fig. 5 is a detail vertical section of the feeding-clutch and brake-dog devices. Fig. 6 is a fragmental plan of a portion of the wheel for supporting the cheese-carrying board and the operating devices therefor in different positions to that shown in Fig. 3.

1 designates a suitable base or frame which may be of the usual circular form and may have cross-arms $1^a$. A wheel or rotatable member 2, herein termed the "cheese-carrier," is journaled by a pivotal stud 3, centrally of the base 1, on said cross-arms $1^a$, and the cheese-carrying board $3^a$ rests on and is carried around with said rotatable member 2. 4 designates the operating-handle on a lever 5, pivoted at 6 to the cross-arms $1^a$ on the base 1 and connected to operate the wheel or rotary member 2. For this purpose said lever 5 may engage an auxiliary or intermediate lever 7, the lever 7 having a depending stud $5^a$, which engages in a fork or notch $5^b$, formed in the lever 5, the lever 7 being pivotally mounted concentrically with the wheel or cheese-carrier 2 on the pivot-stud 3. The lever 7 is provided at its outer end with a clutch for causing engagement thereon with the wheel 2 when the lever is moved in one direction only. This clutch device preferably comprises a movable member, such as a ball or rolling device 8, traveling in a way 9, formed in the block 10 on the end of the lever 7, said way being inclined to cause the ball in rolling in one direction thereon to bind against the wheel 2 and when rolling in the other direction to release therefrom.

The block 10 has an overhanging flange 11 at its top engaging over the rim of wheel 2 to hold the latter down to receive the gripping action of the ball. A spring 12, secured at one end to lever 7, extends at its free end in the path of ball 8, so as to limit the movement of said ball and also to tend to hold or press said ball toward the upper end of the way 9, this pressure being very light, so as not to cause a gripping engagement, but to hold the ball in contact with both the way and with the wheel in readiness for such engagement.

Means are also provided for braking or resisting the movement of the wheel in a reverse direction to that caused by the clutch device aforesaid. This braking device is also a friction-clutch and comprises a ball or rolling device 13, traveling in an inclined way 15 in a lug 14 on the base 1 and engaging with the bottom of wheel 2 to grip thereon in one direction of movement and to release the wheel in the other direction of movement of the latter. The lug 14 has an overhanging flange $14^a$ extending over the rim of wheel 2 to hold it down to receive the gripping action.

A spring 16 holds the ball 13 in position to instantly grip and hold the wheel against tendency to reverse rotation.

17 designates an adjustable stop or gage plate movably supported on the base 1 and provided with means for engaging with a suitable device on the handle-lever 5 to enable said lever to be accurately stopped or arrested at definite or determined points corresponding to the weight of the piece of cheese to be cut off. The stop means on member 17 is so arranged or formed that the adjustment of said member will vary the amount of angular travel that is permitted to the handle-lever 5 before it is arrested thereby. Said member 17 consists of a plate pivoted at 18 to the base 1 and having a plurality of series of stop portions 19 thereon, preferably formed as grooves. The device on the handle-lever for engaging such stop portions consists of a pin 20, sliding in a vertical passage 21 in the handle-lever and pressed down toward the plate 17 by a spring 22, set in a socket or housing 23 and acting against a collar 27 on the pin 20. A lever 24, pivoted at 25 to the handle, has a fork 26 engaging under the collar 27. Said lever is engaged at its other end by a depression-pin 28, sliding in the handle 4 and adapted to be pressed by the thumb to tilt the lever 24, and thereby move the pin 20 away from the stop-plate 17, so as to permit free angular movement of the handle-lever. When the pin 28 is released, the spring 22 will cause the pin 20 to engage the surface of the stop-plate 17 and to snap into the first stop-groove 19 that is presented in the course of the movement of the handle-lever. The said grooves 19 are eccentric to the pivot 18 of the plate 17, so that on angular movement or adjustment of plate 17 around its pivot the distance between successive grooves in the movement of the handle-lever will be varied. The shoulders or walls of the respective grooves 19 act as stop portions for engaging the stop-pin 20, and owing to their divergence in the direction of adjustment of the stop-plate member they are at different or variant distances in the direction of movement of lever 5 in the different angular positions of said stop-plate member.

Gage or stop plate 17 is provided with means for indicating the angular adjustment thereof, said means consisting, for example, of index-marks 30 on or near its periphery and an index or indicator mark 31 arranged in fixed position on the frame—for example, on a block 32, which is clamped by a clamp-screw 33. The peripheral edge of the plate 17, which is concentric with the pivot 18, is preferably beveled, as shown at 34, and the clamp device is clamped down to the base, so as to hold the plate 17 in adjusted position. The indicating-marks 30 on the plate 17 may be designated with suitable characters corresponding to the weights of the cheeses to be cut, and the stop-grooves 19 are designated with marks corresponding to the weights of the pieces of cheese that are to be cut off—for example, one-fourth pound, one-half pound, &c.—the first groove, however, being merely a stop-groove representing the starting position of the knife.

36 designates the cheese-cutting knife mounted on a knife-frame 37, which is pivoted at 38 on a bracket or standard 39, rising from base 1. Said knife has a handle 40 and slides on frame 37, being, for example, provided with slots 41, engaging over pins or bolts 42 on said frame. One of said bolts may have a clamp-screw device or butterfly-nut 43 for clamping the blade in fixed position where a sliding movement is not desired.

The operation is as follows: The cheese having been weighed, it is placed on board 3. Clamp-screw 33 is loosened and gage or stop plate 17 is adjusted in or out to bring opposite the fixed mark 31 that mark 30 which corresponds to the weight of the entire cheese and the plate then reclamped. Handle-lever 5 is assumed at this time to be in position with its detent-pin resting in the first groove 19. When it is desired to cut a piece of cheese, the knife which has been raised for insertion of the cheese is depressed, cutting the cheese radially to the center. Then the knife is again raised and the handle 4 is grasped, the pin 28 depressed by the thumb, thereby lifting the pin 20 from plate 17, and the handle-lever is moved to the right until pin 20 approaches the groove 19 corresponding to the weight of cheese to be cut off, whereupon pin 28 is released, and as the handle moves on the pin 20 swings into the proper groove 19 and the handle is arrested. On depressing the knife the required weight of cheese will be cut.

Generally the knife-blade may be clamped to its handle-frame, so as to be more conveniently manipulated; but in case the cheese-cloth at the bottom does not sever readily the clamp may be loosened and the knife reciprocated to cut the same, The various parts of the device may be variously modified without departing from the invention.

What we claim is—

1. In a cheese-cutter, the combination of a frame, a cheese-carrier rotatably mounted thereon, a handle-lever connected to rotate said carrier, and provided with a stop device, a stop member pivoted on said frame to move transversely to the movement of the handle, and means for holding said stop member in different angular positions, said stop member being provided with stop portions arranged at variant distances in the path of movement of the stop device on the handle in the different angular positions of the stop member.

2. In a cheese-cutter, the combination of a frame, a cheese-carrier rotatably mounted thereon, a lever connected to rotate said carrier, a spring-operated stop-pin movable on said lever provided with releasing means, a stop-plate pivoted on the frame and having a plurality of stop portions for engagement with the stop device and extending eccentrically to said pivot, and a clamp device on the frame engaging and holding the stop-plate.

In testimony whereof we have hereunto set our hands, at California, this 6th day of February, 1905.

ARLAND B. ROACH.
ARTHUR J. HODGE.

In presence of—
JOHN MCDONALD,
E. E. PHIPPS.